United States Patent
Tran et al.

(10) Patent No.: US 10,491,016 B2
(45) Date of Patent: Nov. 26, 2019

(54) CHARGING SYSTEM, BASE AND CELL HOLDER

(71) Applicant: MOTOROLA SOLUTIONS, INC., Chicago, IL (US)

(72) Inventors: Chi T. Tran, Wauwatosa, WI (US); Jorge L. Garcia, Plantation, FL (US); Goktug Duman, Oakland Park, FL (US); Sebastian Serrano, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/668,193

(22) Filed: Aug. 3, 2017

(65) Prior Publication Data
US 2019/0044353 A1 Feb. 7, 2019

(51) Int. Cl.
*H02J 7/14* (2006.01)
*H02J 7/00* (2006.01)

(52) U.S. Cl.
CPC .......... *H02J 7/0044* (2013.01); *H02J 7/0027* (2013.01); *H02J 7/0045* (2013.01); *H02J 2007/0095* (2013.01)

(58) Field of Classification Search
CPC ...... H02J 7/0044; H02J 7/0045; H02J 7/0042; Y02E 60/12; H01M 10/46
USPC .......................................................... 320/115
See application file for complete search history.

(56) References Cited

U.S. PATENT DOCUMENTS

| | | | | |
|---|---|---|---|---|
| 5,327,067 A | * | 7/1994 | Scholder | H02J 7/0042 320/107 |
| 5,525,888 A | | 6/1996 | Toya | |
| 5,733,674 A | | 3/1998 | Law et al. | |
| 5,801,513 A | * | 9/1998 | Smith | H02J 7/0068 307/66 |
| 6,049,192 A | * | 4/2000 | Kfoury | H02J 7/0044 320/113 |
| 6,348,776 B2 | * | 2/2002 | Kim | H02J 7/0045 320/110 |
| 2001/0029195 A1 | * | 10/2001 | Lin | H02J 7/0044 455/573 |
| 2004/0135541 A1 | | 7/2004 | Cho et al. | |
| 2004/0204056 A1 | * | 10/2004 | Phelps, III | H02J 7/0044 455/556.1 |

(Continued)

OTHER PUBLICATIONS https://www.motorolasolutions.com/en_us/products/police-camera-accessories/pmpn4119.html#tabcompatibleproducts—Retrieved on Aug. 1, 2017.

(Continued)

*Primary Examiner* — Arun C Williams
(74) *Attorney, Agent, or Firm* — Perry + Currier Inc.

(57) ABSTRACT

A system for charging a device and a power cell for the device includes a support base and a holder for the cell. The support base is shaped to define an array of slots. Each slot has an internal profile to complement an external profile of the device and an external profile of the holder. Each slot has charging contacts positioned to connect to contacts of the device and to contacts of the holder. The support base has electrical conductors that connect the charging contacts with a power source to provide power to the device or holder situated in the slot. The holder has a charging circuit to control charging of the cell held by the holder.

20 Claims, 10 Drawing Sheets

(56) References Cited

U.S. PATENT DOCUMENTS

| | | | | |
|---|---|---|---|---|
| 2005/0024011 A1* | 2/2005 | Chen | .................... | H02J 7/0044 |
| | | | | 320/107 |
| 2008/0303481 A1* | 12/2008 | Silverbrook | ............. | B41J 3/445 |
| | | | | 320/115 |
| 2010/0079106 A1* | 4/2010 | Graham | ................ | H02J 7/0044 |
| | | | | 320/115 |
| 2010/0102777 A1* | 4/2010 | Sa | ......................... | H02J 7/0044 |
| | | | | 320/115 |
| 2011/0134601 A1 | 6/2011 | Sa | | |
| 2012/0113645 A1* | 5/2012 | Liao | ..................... | H02J 7/0042 |
| | | | | 362/253 |
| 2013/0052502 A1* | 2/2013 | Su | ......................... | H02J 7/0045 |
| | | | | 429/99 |
| 2013/0093386 A1* | 4/2013 | Tsai | ....................... | H02J 5/005 |
| | | | | 320/108 |
| 2015/0178539 A1* | 6/2015 | Gerst, III | ........... | G06K 7/10831 |
| | | | | 235/472.02 |
| 2015/0194833 A1 | 7/2015 | Fathollahi et al. | | |

OTHER PUBLICATIONS https://www.motorolasolutions.com/en_us/products/police-camera-accessories/pmpn4085.html#tabcompatibleproducts—Retrieved on Aug. 1, 2017.

http://www.samsung.com/uk/consumer/mobile-devices/accessories/battery/EB-K600BEWEGWW/—Retrieved on Aug. 1, 2017.

UKIPO, Combined Search and Examination Report under Sections 17 and 18(3). dated Jan. 11, 2019, re UK Patent Application No. 1812125.1.

* cited by examiner

CHARGING SYSTEM, BASE AND CELL HOLDER

BACKGROUND OF THE INVENTION

Charging power cells at communications devices, such as radio devices and cellular phones, have various challenges. Internal charging circuits plugged into walls, generally render a communication device at least temporarily non-portable and/or non-usable. Use of portable charging devices, for example to charge a removable power cell, again render a device inoperable while the power cell is removed and charging.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
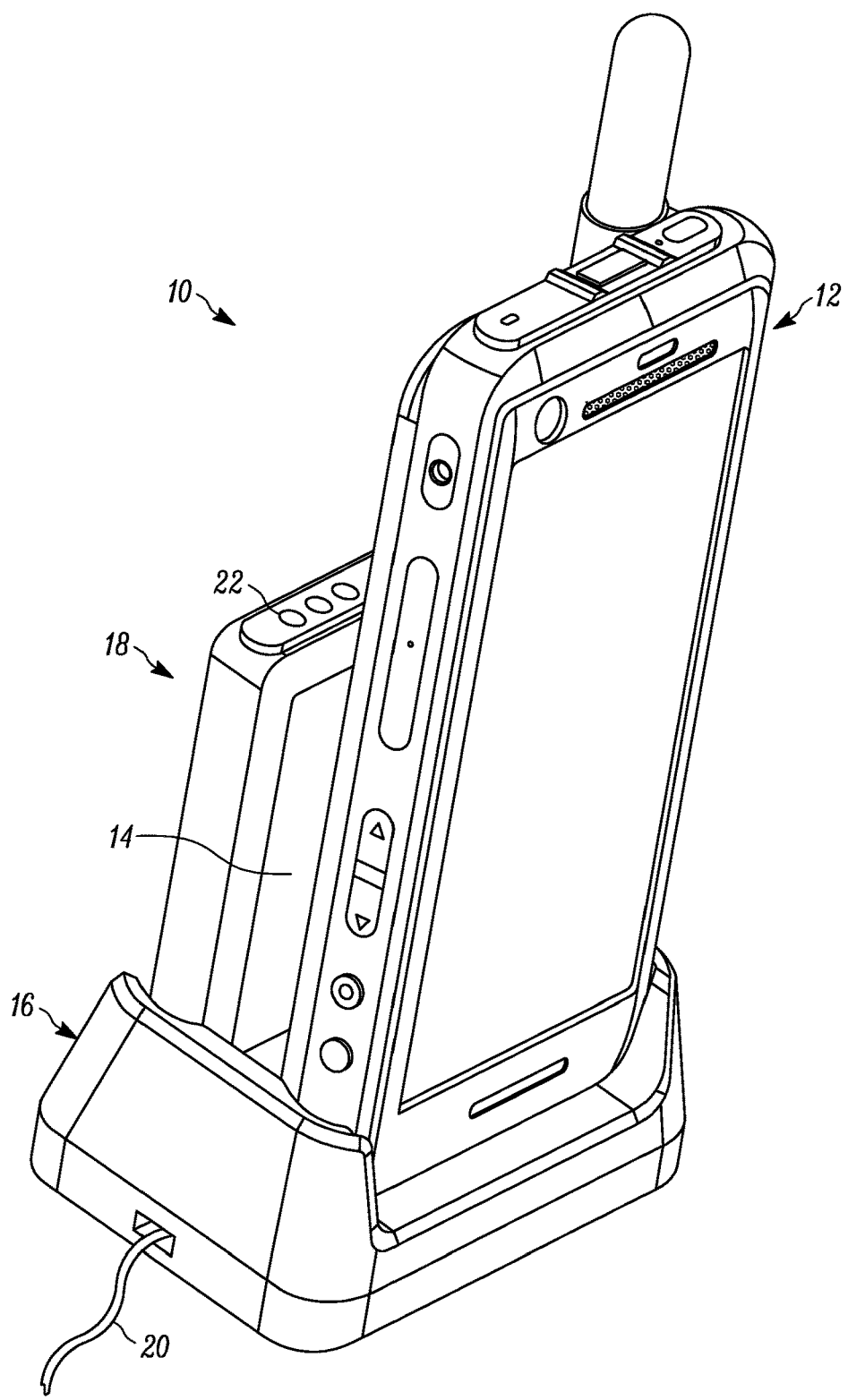
FIG. 1 is a perspective view of a charging system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A system for charging a wireless communication device and a cell for the wireless communication device, according to some embodiments, includes a support base and a holder.

The support base is shaped to define an array of slots. Each slot has an internal profile. The internal profile is shaped to complement an external profile of the wireless communication device to removably receive the wireless communication device in the slot. Each slot has charging contacts positioned to electrically connect to contacts of the wireless communication device. The support base has electrical conductors electrically connected to the charging contacts of each slot for providing power to the charging contacts of each slot to charge the wireless communication device when disposed in each slot.

The holder is shaped to define an internal volume to removably receive a cell to be charged. The holder is further shaped to have an external profile that complements the internal profile of each slot of the support base to removably fit the holder into each slot. The holder further has output charging contacts positioned to electrically connect to the cell and further has input charging contacts positioned to electrically connect to the charging contacts of each slot of the support base. The holder further has a charging circuit connected to the output charging contacts and to the input charging contacts. The charging circuit controls charging of the cell through the output charging contacts using power drawn from the charging contacts of the support base through the input charging contacts of the holder.

FIG. 1 shows a system 10 for charging an electronic communication device 12 and a cell 14, which may be a cell designed for use in the communication device 12.

The system 10 includes a support base 16 and a holder 18. The holder 18 receives a cell 14 to be charged. The support base 16 receives and charges any number and combination of communication devices 12 and cells 14 carried in holders 18. A plurality of holders may be provided to carry and charge a plurality of cells 14. The support base 16 may also physically support any inserted communication device 12 and cell holder 18 in, for example, the upright orientation shown. The support base 16 may be provided with power via an external power source with a removable power cable 20.

The communication device 12 may be a wireless radio, a cellular phone, or similar device. An electronic device that is not configured for communications can be used. The communication device 12 is configured to removably receive a cell 14, which may allow cells to be swapped out for continuous use of the communication device 12. The type of communication device 12 is not particularly limited.

The holder 18 includes a charging circuit for charging the cell 14 using power provided by the support base 16, which may include an internal power source, but which omits a charging circuit for the cell 14. An illuminating indicator 22 may be provided to the holder 18 to show a charging state of the contained cell 14.

The cell 14 may be any suitable electrochemical cell for providing power to the communication device 12 or a similar electronic device. The cell 14 has an outer casing and is configured to removably fit into the communication device 12 or otherwise electrically connected to the communication device 12. The cell 14 may be provided in a battery with one or more other cells. The cell 14 by itself may be termed a battery.

Figure 2:
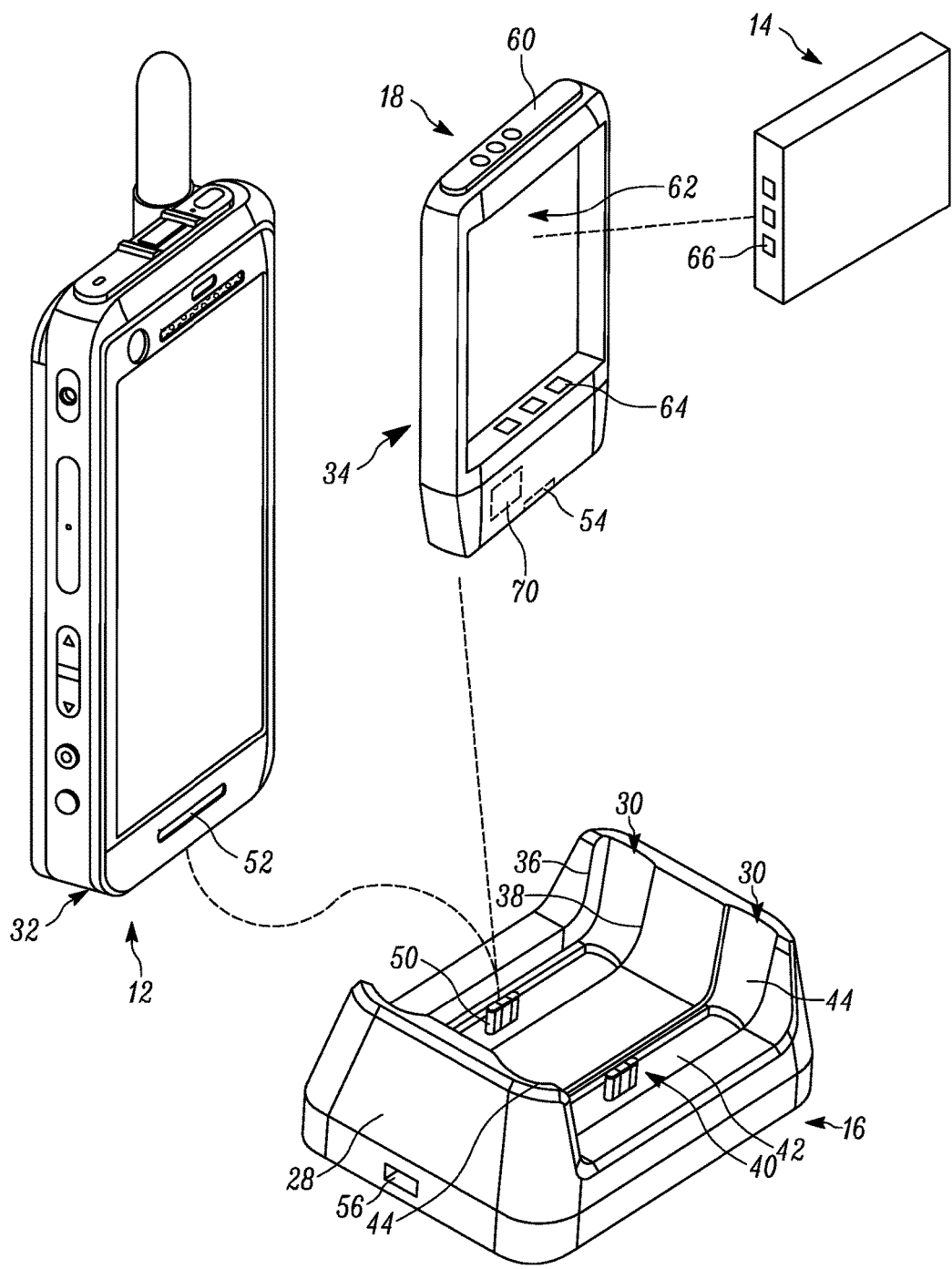
FIG. 2 is an exploded perspective view of an embodiment of the charging system.

With reference to FIG. 2, the support base 16 includes a housing 28 that is shaped to define an array of slots 30. The number and arrangement of slots 30 is not particularly limited. The slots 30 may be arranged linearly, as shown, or according to another layout, such as a two-dimensional grid or curved pattern.

Each slot 30 has an internal profile. The internal profile complements an external profile 32 of the communication device 12 to removably receive the communication device 12 in the slot 30. The internal profile also complements an external profile 34 of the holder 18 to removably fit the holder 18 into the slot 30.

In this embodiment, the internal profile is defined by three connected walls 36, 38, 40. Two opposing generally flat end walls 36, 38 face each other across a separating gap that is sized to accommodate separate insertion of the communication device 12 or the holder 18. The end walls 36, 38 may be vertical or tilted with respect to the vertical. The end walls 36, 38 need not be the same shape or size. A bottom wall 40 joins the end walls 36, 38. The bottom wall 40 includes a bottom region 42 and two opposing side regions 44 that extend at least somewhat vertically. The transition from the bottom region 42 to each opposing end region 42 may be curved, as shown, or take another shape. The overall shape of each slot 30, as defined by its walls 36, 38, 40 is a cup-like shape that cradles and supports the inserted communication device 12 or holder 18.

The external profile 32 of the communication device 12 has walls that complement the walls 36, 38, 40 of each slot 30.

Each slot 30 of the support base 16 has charging contacts 50 positioned therein to electrically connect to contacts 52 of the communication device 12 and to contacts 54 of the holder 18. In this embodiment, the charging contacts 50 are provided at a male plug, such as a Universal Serial Bus (USB) plug, e.g., a USB-C plug. Likewise, in this embodiment, the contacts 52 of the communication device 12 are provided in a female port or receptacle, such as a USB-C receptacle. Other types of charging contacts, such as exposed surface contacts and different types of plugs/receptacles, are also contemplated.

The support base 16 may include a receptacle 56 at the outside of the housing 28 for receiving connection of the power cable 20 (FIG. 1) to provide power to the charging contacts 50 of each slot 30. Each slot 30 may have its own cable 20 and receptacle 56 or several slots 30 may share a cable and receptacle 56. Further, in this embodiment, the charging contacts 50 are directly electrically connected to the receptacle 56, so that power passes through the support base 16. That is, the support base does not include charging circuitry other than simple conductors. In other embodiments, the power cable 20 may extend through the housing 28, omitting the need for a receptacle 56, to provide the pass-through connection to the charging contacts 50 of each slot 30.

A power source that provides power via a power cable 20 may be selected to match the specific needs of a cell 14 to be charged in its holder 18 or the needs of a communication device 12 to be charged, as the case may be. This allows the system 10 to be customized around the support base 16 by selecting any desired power sources and holders 18.

The holder 18 includes a housing 60 shaped to define an internal volume 62 to removably receive the cell 14. The outside of a lower portion of the housing 60 is shaped to define the external profile 34 for fitting the housing into each slot 30. The external profile 34 has walls that complement the walls 36, 38, 40 of each slot 30. The external profile 34 of the holder 18 may be identical to the external profile 32 of the communication device 12, but need not be identical provided that the external profiles 32, 34 have a commonality in shape sufficient to match the common slot 30.

The holder 18 further includes input charging contacts 54 disposed at an outside of the housing 60 to electrically connect to the charging contacts 50 of each slot 30 of the support base 16. In this embodiment, the input charging contacts 54 are provided in a female port or receptacle, such as a USB-C receptacle. The input charging contacts 54 of the holder 18 are of the same type and have the same relative position as the contacts 52 of the communication device 12.

The holder 18 further includes output charging contacts 64 positioned within the internal volume 62 to electrically connect to complementary contacts 66 on the outside of the cell 14 when the cell 14 is inserted into the holder 18. The output charging contacts 64 and the corresponding contacts 66 of the cell 14 may be exposed surface contacts, a plug and receptacle combination, or similar.

The holder 18 further includes a charging circuit 70 disposed within the housing 60. The charging circuit 70 connects the input charging contacts 54 to the output charging contacts 64 and controls charging of the cell 14, when inserted, through the output charging contacts 64 with power drawn from the support base 16 through the input charging contacts 54.

In operation, the support base 16 is provided power via a power source, thereby providing pass-through power to the charging contacts 50 of each slot 30. A communication device 12 to be charged is inserted into any available slot 30, and the onboard charging circuit of the communication device 12 thereby charges a cell 14 carried by the communication device 12. A loose cell 14 to be charged is inserted into the holder 18. The holder 18 is inserted into any available slot 30, and the charging circuit 70 of the holder 18 thereby charges the cell 14. The support base 16 may be provided with any number of slots 30 for simultaneously charging any number and combination of communication devices 12 and holder-carried cells 14.

Figure 3:
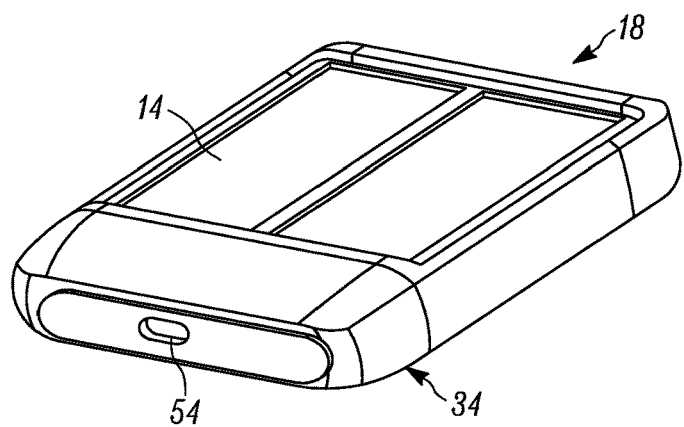
FIG. 3 is a perspective view of an embodiment of a holder for a cell.
Figure 4:
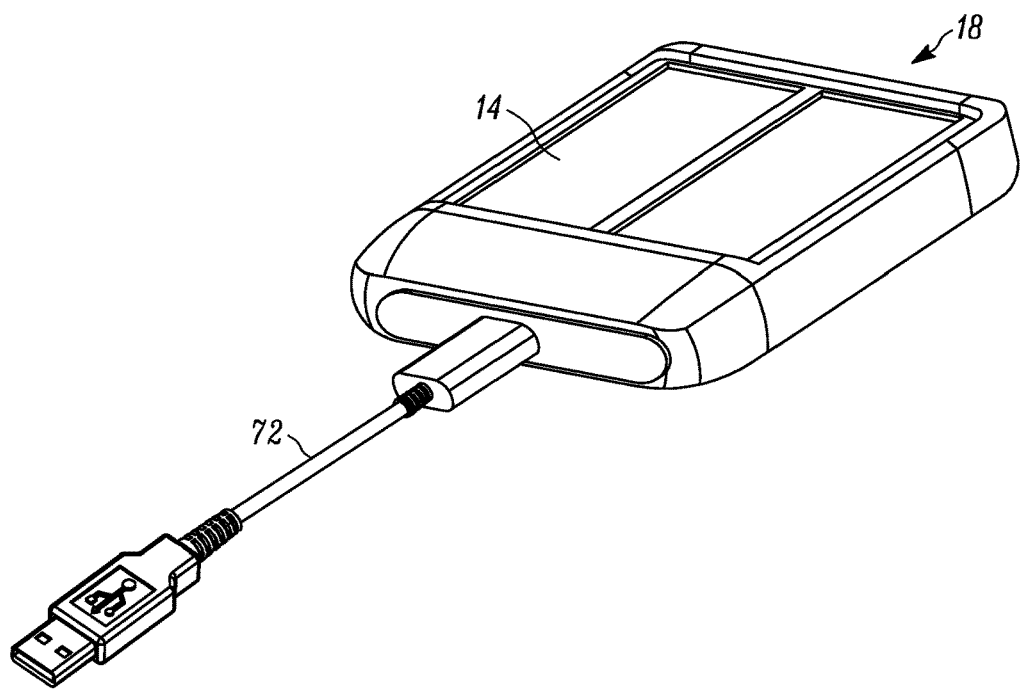
FIG. 4 is a perspective view of an embodiment of a holder for a cell with a cable attached.

As shown in FIGS. 3 and 4, in various embodiments, the holder 18 includes the input charging contacts 54 in the form of a receptacle, which can receive the plug of a charging cable 72. The charging cable 72 can be used to charge a cell 14 inserted into the holder 18 without the use of the support base 16. This allows a loose cell 14 to be charged when away from the support base 16. For example, the support base 16 may be installed in an office, so the user may take a holder 18, cell 14, and cable 72 when working from a vehicle. A vehicle power adaptor may be provided to convert a vehicle's electrical power to a form usable by the holder 18. The vehicle power adaptor may be built-in to the vehicle or may be a separate component that is plugged into a power port of the vehicle.

Figure 5:
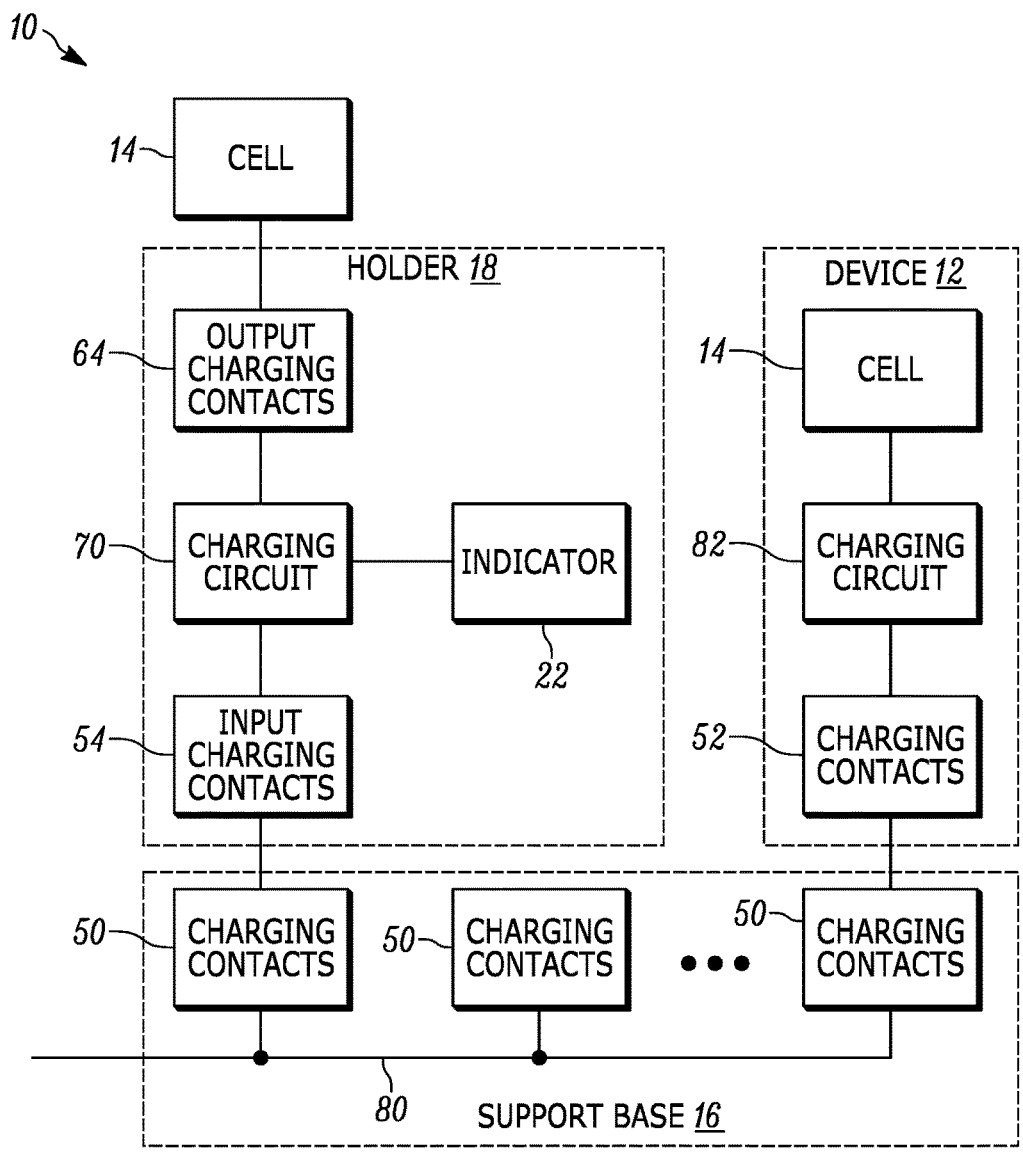
FIG. 5 is a block diagram of an embodiment of the charging system.

FIG. 5 shows a block diagram of the charging system 10 showing electrical components and connections.

At the holder 18, the charging circuit 70 is connected to the output charging contacts 64 and the input charging contacts 54. An illuminating indicator 22 may be provided as connected to the charging circuit 70. The charging circuit 70 is configured to control charging of a cell 14 inserted into the holder 18 and electrically connected to the output charging contacts 64. The charging circuit 70 draws charging power through the input charging contacts 54 from the charging contacts 50 of the support base 16, in whichever slot the holder 18 is inserted. The charging circuit 70 may be configured to detect a charging requirement of the cell 14 and deliver power accordingly.

In various embodiments, the charging circuit 70 communicates with the power supply to negotiate a target or optimum amount of power that is needed to charge the cell 14. The power source communicates with the charging circuit 70 to provide such amount of power.

The charging contacts 50 of each slot are connected to one or more power sources (not shown) by one or more pass-through electrical conductors 80 disposed in the housing of the support base 16. As such, the support base 16 lacks a charging circuit, which may reduce the complexity of the support base 16. The charging circuit is instead provided to the holder 18, which allows the charging circuit to be specifically configured for the specific type of cell 14. Hence, the support base 16 can support various kinds of cells 14, with the respective holder 18 for each type of cell 14 being physically compatible with the slots in the support base, physically shaped to receive the respective type of cell 14, and able to provide the specific charging functionality required by the respective type of cell 14. That is, the specific requirements of a cell 14 are accommodated by the holder 18 instead of by the base 16, with the base 16 being generic to various holders 18 and various electronic devices 12.

The illuminating indicator 22 is configured to indicate a charging state of the cell 14 according to a signal outputted by the charging circuit 70. The illuminating indicator 22 may include a light-emitting diode (LED) or similar and may indicate states such as charging and fully charged.

Also shown in FIG. 5 is a communication device 12 that contains its own charging circuit 82 for charging a cell 14 contained within the device 12 via charging contacts 52 that engage with charging contacts 50 or any of the slots of the support base 16. It should be apparent that the holder 18 and the communications device 12 contain charging circuits 70, 82 specific to the cells 14 that each support, thereby reducing or eliminating the need for the support base 16 to include such charging circuits.

One or more power sources may be provided as internal or external to the support base 16. An example power source converts alternating current (AC) wall power into direct current (DC) power made available to the electrical conductors 80 for the charging contacts 50. The power source may include a transformer, converter, rectifier, and similar components. Various embodiments of the support base are discussed below, and features and aspects of each of these embodiments may be combined with other embodiments described herein.

Figure 6:
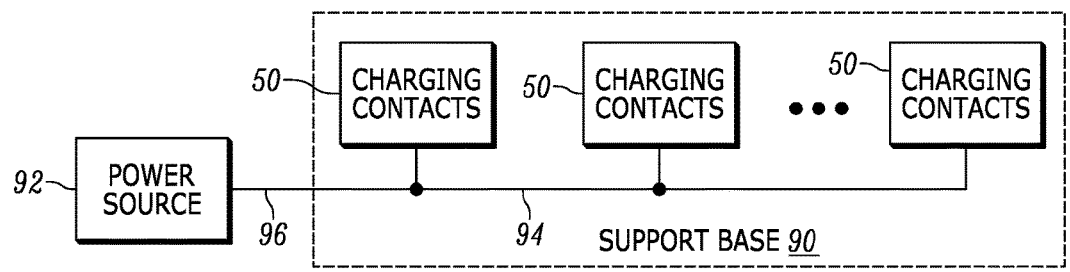
FIG. 6 is a block diagram of an embodiment of a support base having an external power source.

With reference to FIG. 6, a support base 90 is connected to an external power source 92. The external power source 92 may include a wall plug that connects to internal pass-through conductors 94 via an external cable 96 to deliver power to the charging contacts 50. The external cable 96 may be removeable.

Figure 7:
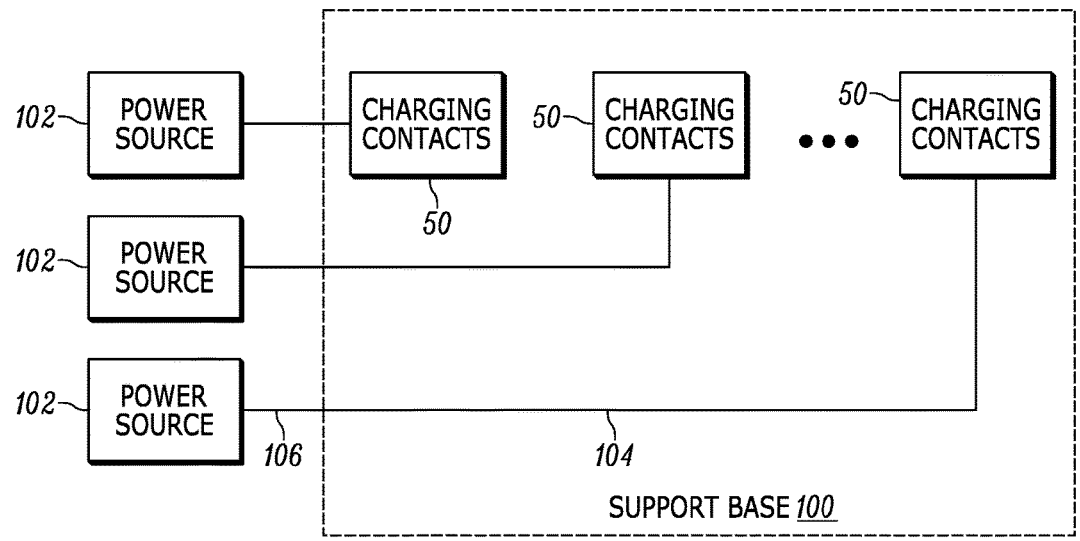
FIG. 7 is a block diagram of another embodiment of a support base having several external power sources.

With reference to FIG. 7, a support base 100 is connected to several external power sources 102. Each external power source 102 may include a wall plug that connects to respective internal pass-through conductors 104 via respective external cables 106, such as USB cables. Each set of pass-through conductors 104 connects to one set of charging contacts 50, thereby giving each set of charging contacts 50 its own dedicated power pathway. Each external cable 106 may be removable. The external power sources 102 may be provided together as housed in the same unit. Such a unit may have one common power input, such as a wall plug, that distributes power to each power source 102.

Figure 8:
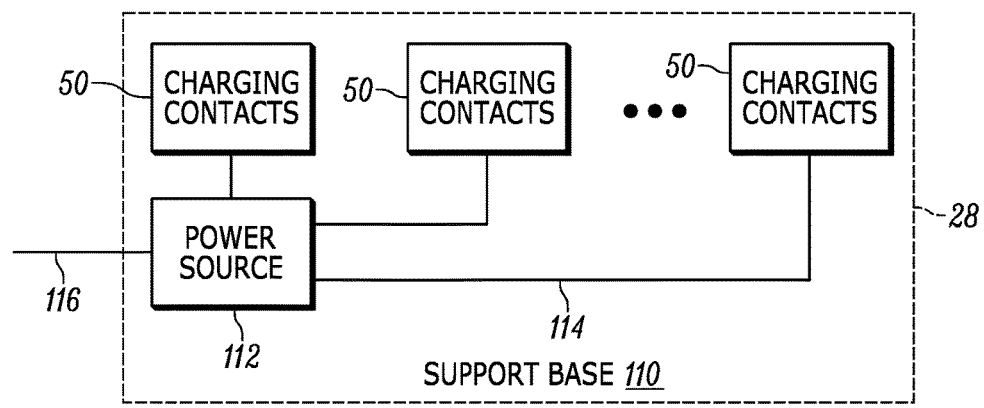
FIG. 8 is a block diagram of an embodiment of a support base having an integrated power source.

With reference to FIG. 8, a support base 110 has an integrated power source 112 disposed within the housing 28 of the support base 110. The power source 112 connects to sets of internal conductors 114 and to at least one external cable 116, such a USB cable, which may be removable. Each set of conductors 114 connects to one set of charging contacts 50, thereby giving each set of charging contacts 50 its own dedicated power pathway.

Figure 9:
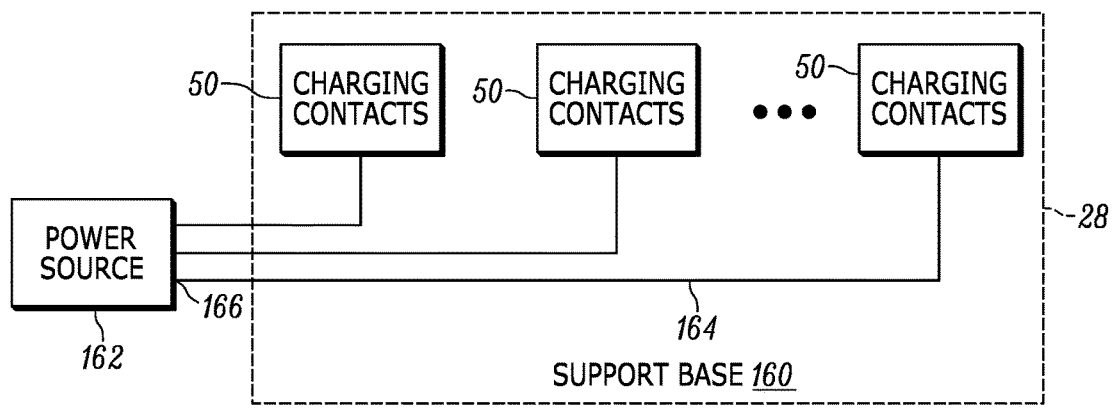
FIG. 9 is a block diagram of an embodiment of a support base having an external power source.

With reference to FIG. 9, a support base 160 is connected to an external power source 162. The external power source 162 may include a wall plug that connects to separate conductors 164 to deliver power to the charging contacts 50. The power source 162 includes a plurality of output ports 166. Conductors 164 connect each output port 166 of the external power source 162 to a respective set of charging contacts 50. Each conductor 164 may include an internal segment that passes through the support base 160 and an external segment that may be unpluggable from the support base 160. The power source 162 may be configured to provide USB power to the contacts 50 and the external segment of each conductor 164 may be a USB cable.

Figure 10:
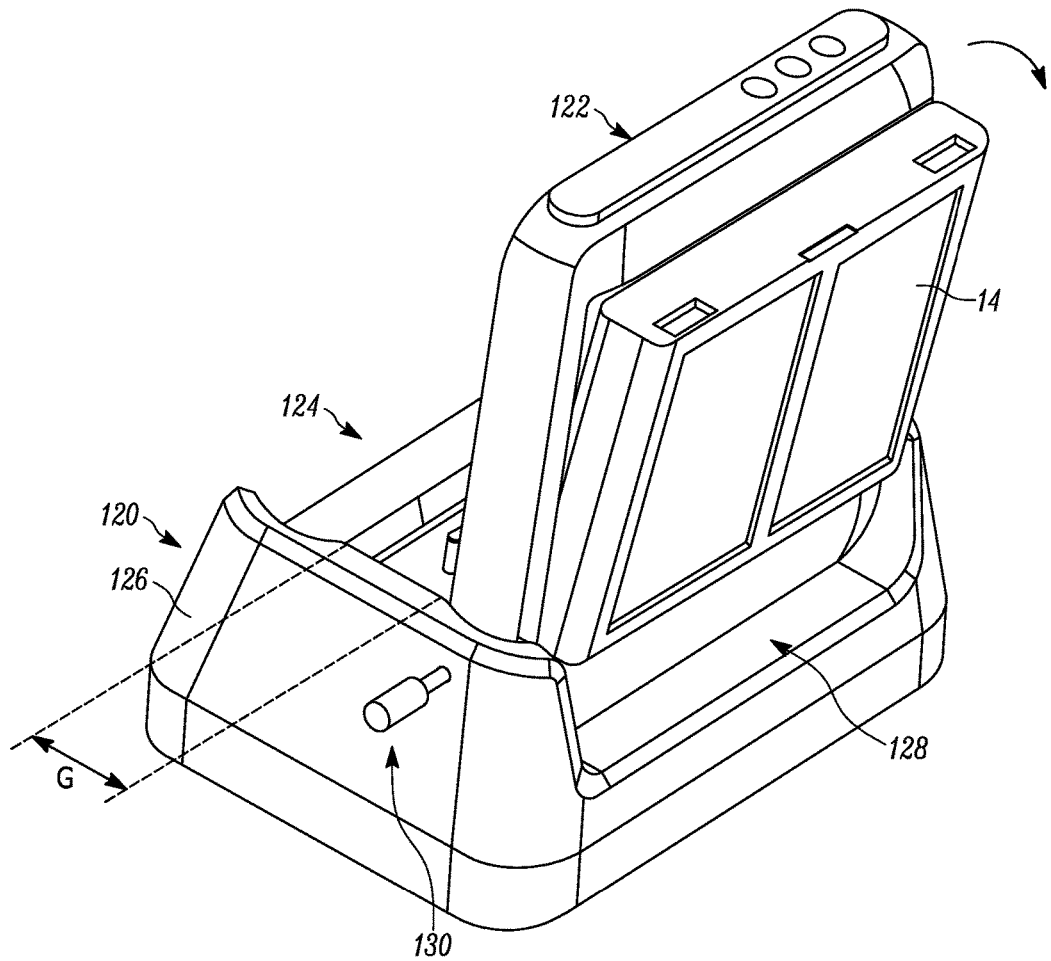
FIG. 10 is a perspective view of a holder and support base according to another embodiment.

FIG. 10 shows another embodiment of a support base 120 and a holder 122. Unless otherwise mentioned, the support base 120 and holder 122 may be similar or identical to the other support bases and holders described herein. Further, features and aspects of this embodiment may be combined with other embodiments described herein.

The support base 120 includes a housing 126 that defines an array of slots 124. The housing 126 is shaped to provide clearance for receiving and removing a cell 14 from the holder 122 when the holder 122 is disposed in a slot 124. Clearance may be provided as an opening 128 at an end of the housing 126, the opening being shaped and sized to allow the cell 14 to be rotated and/or slid out from the holder 122 while the holder 122 remains in its slot 124. Alternatively or additionally, clearance may take the form of a gap G between adjacent slots 124, the gap G being large enough for the cell 14 to be rotated and/or slid out from the holder 122 while the holder 122 remains in its slot 124. Such clearance may be provided to any number of slots 124.

The support base 120 further includes a locking structure 130 for a slot 124 that is configured to receive and removing a cell 14 from the holder 122 while the holder 122 remains in the slot 124. Any number of slots 124 may be provided with a locking structure 130.

The locking structure 130 is configured to releasably lock with a complementary locking structure on the holder 122. The locking structure 130 may include any mechanism or structure capable of removably securing the holder 122 to the support base 120 against forces needed to remove the cell 14 from the holder 122. Examples of such mechanisms and structures include a detent, a snap or interference fit, a screw, a movable pin, and similar.

Figure 11:
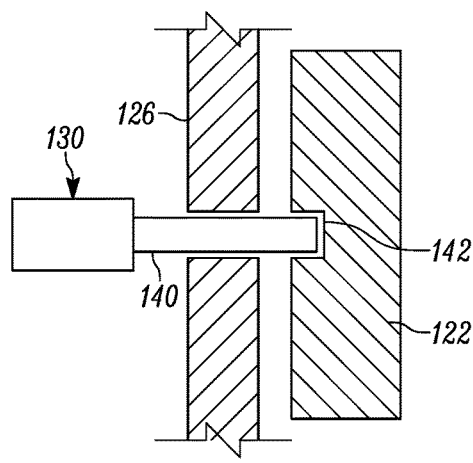
FIG. 11 is a cross-sectional view of an embodiment of a locking structure for locking the holder to the support base.

FIG. 11 shows an example locking structure. The locking structure 130 at the support base 120 includes a pin 140 extending through a hole in the housing 126. The complementary locking structure at the holder 122 includes a recess 142 shaped and positioned to receive the pin 140. The pin 140 may be spring-loaded or otherwise biased into engagement with the recess 142. Alternatively, the pin 140 and recess 142 may be threaded, such that the pin is screwed into the recess 142.

Figure 12:
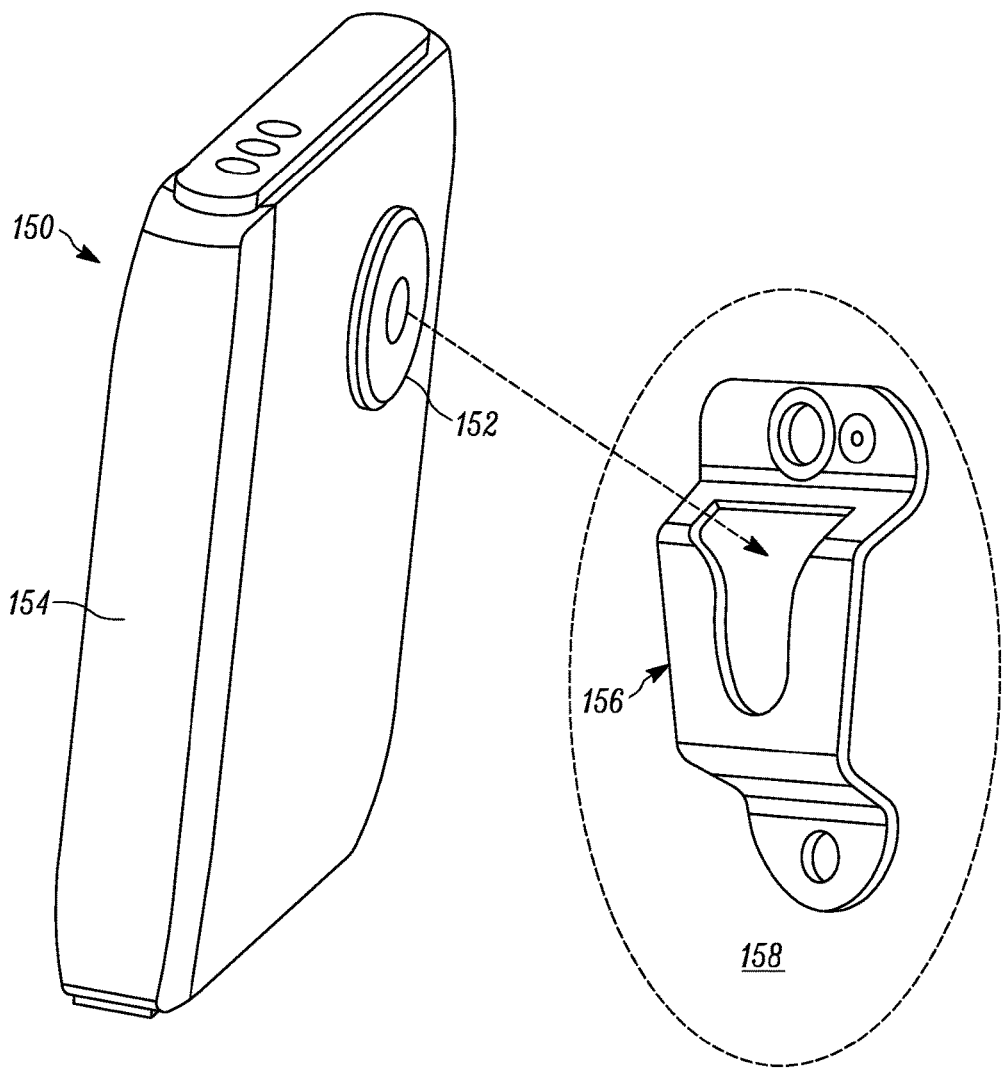
FIG. 12 is a perspective view of a holder and mounting structure according to another embodiment.

FIG. 12 shows another embodiment of a holder 150. Unless otherwise mentioned, the holder 150 may be similar or identical to the other holders described herein. Further, features and aspects of this embodiment may be combined with other embodiments described herein.

The holder 150 includes a mounting structure 152 at the outside of its housing 154. In this embodiment, the mounting structure 152 includes a disc that is attached to and offset from a surface of the housing 154 that is opposite the side from which the cell (not shown) is inserted and removed.

The mounting structure 152 is shaped to removably engage with a complementary mounting structure 156, such as a clip, affixed to a support 158, such as a vehicle dashboard. The mounting structure 152 can be positioned to allow the holder 150 to be connected to a power source, such as a vehicle power port, via a cable (e.g., cable 72 of FIG. 4) while the mounting structures 152, 156 are engaged. The mounting structures 152, 156 allow the holder 150 to be temporarily affixed to a support 158 to allow a spare cell to be readily transported, stored, and charged while away from the support base.

Figure 13:
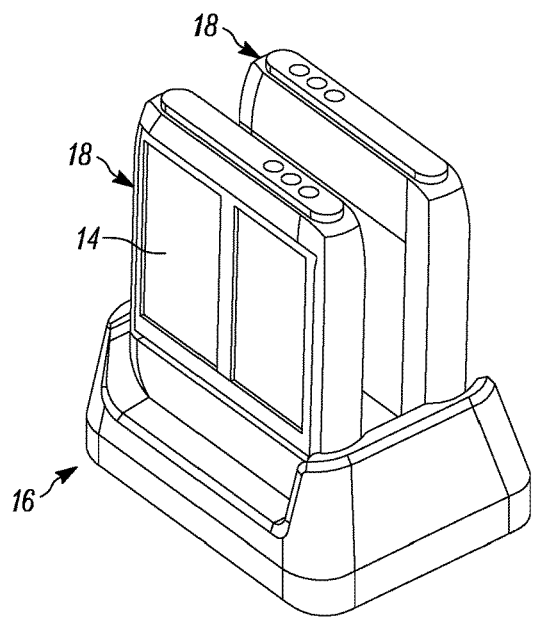
FIG. 13 is a perspective view of an embodiment of a support base containing several holders.

FIG. 13 shows the support base 16 of FIG. 1 accommodating a plurality of holders 18, each containing a cell 14.

Figure 14:
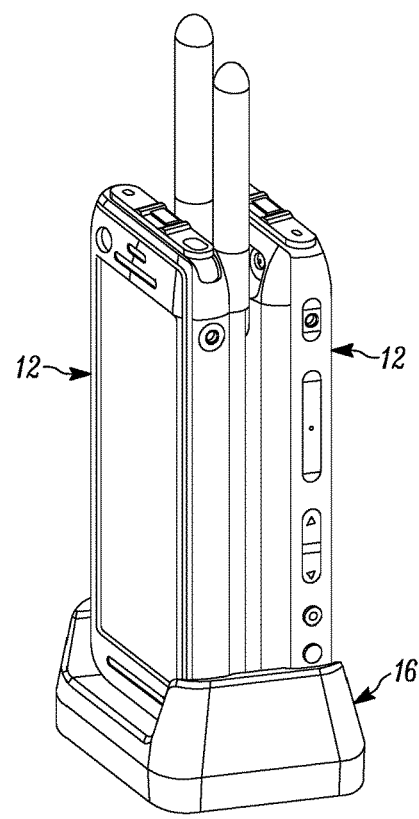
FIG. 14 is a perspective view of an embodiment of a support base containing several communication devices.

FIG. 14 shows the support base 16 of FIG. 1 accommodating a plurality of electronic devices 12.

Figure 15:
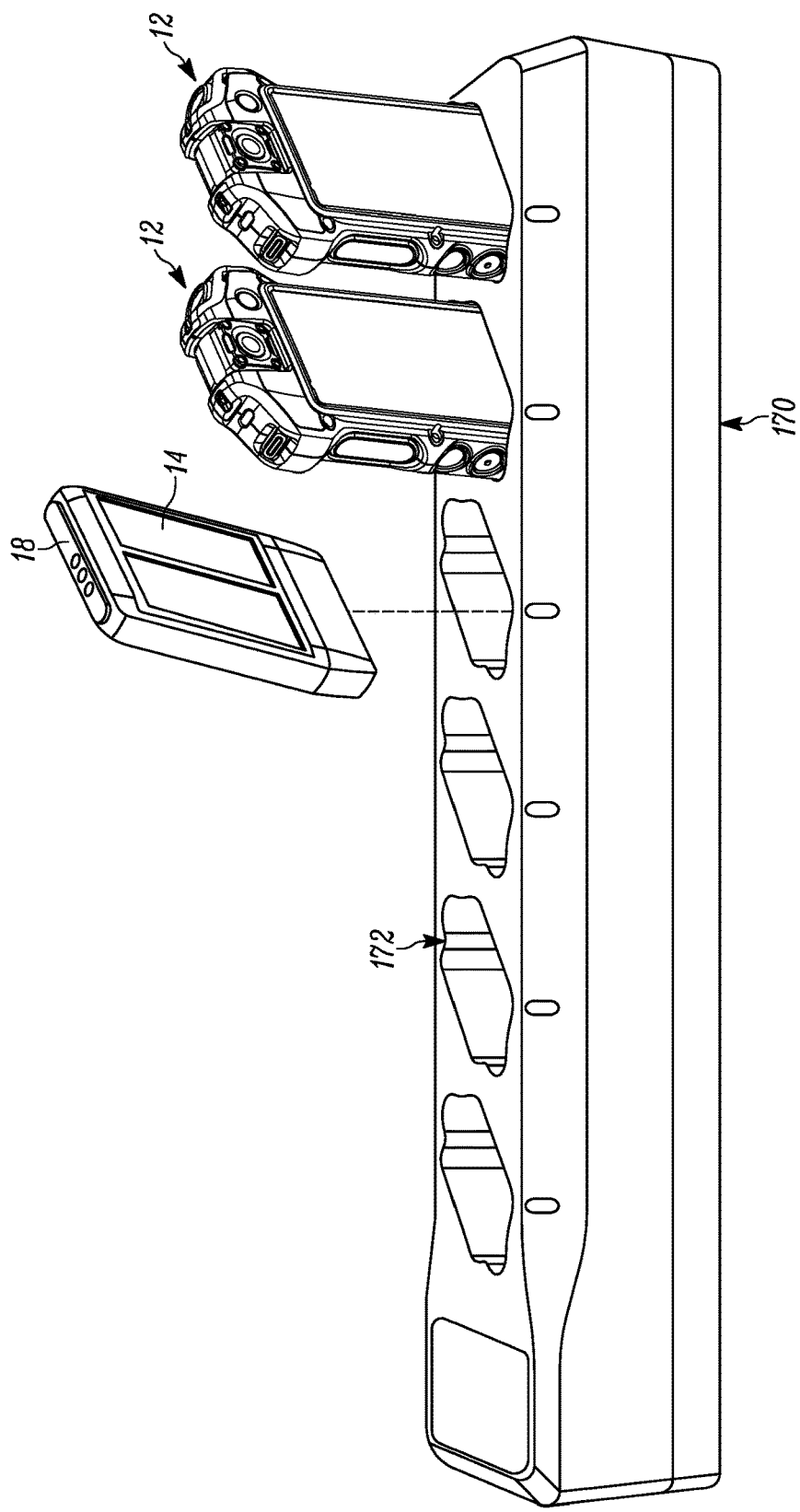
FIG. 15 is a perspective view of a support base according to another embodiment.

FIG. 15 shows a support base 170 according to another embodiment. Unless otherwise mentioned, the support base 170 may be similar or identical to the other support bases described herein. Further, features and aspects of this embodiment may be combined with other embodiments described herein.

The support base 170 includes a plurality of linearly arranged slots 172 shaped to receive holders 18 of cells 14 and electronic devices 12. Each slot 172 has a cavity-like shape.

In view of the above, it should be apparent that the removal of charging circuitry from a support base may increase flexibility of the overall system. The user may select an appropriate cell holder and may select an appropriate power source (e.g., wall plug) for the cell and/or for the electronic device to be charged. Multiple charging solutions can be created to meet the needs of various scenarios, using the same support base by selecting various cell holders and power sources. The system may offer increased efficiency, in that a fewer number of support bases are needed, with customizability being met by the holder and power source. For example, a desk need not be cluttered with multiple different support bases to serve various different cells and devices, which only spend a part of their lives being charged. The system may also be less complex and costly, in that a support base need not be provided with a complex charging circuit or circuits to support many kinds of cells and devices. As such, cells may be charged, in a device or separately, with increased usability and/or portability.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as output and input, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for charging a wireless communication device and a cell for the wireless communication device, the system comprising:
   a support base shaped to define an array of slots, each slot of the array of slots having an internal profile, the internal profile shaped to complement an external profile of the wireless communication device to removably receive the wireless communication device in the slot, each slot having charging contacts positioned to electrically connect to contacts of the wireless communication device, the support base having electrical conductors electrically connected to the charging contacts of each slot for providing power to the charging contacts of each slot to charge the wireless communication device when disposed in each slot; and
   a holder shaped to define an internal volume to removably receive a cell to be charged, the holder further shaped to have an external profile that complements the internal profile of each slot of the support base to removably fit the holder into each slot, the internal profile of each slot to thereby interchangeably receive the wireless communication device or the holder, the holder further having output charging contacts positioned to electrically connect to the cell, the holder further having input charging contacts positioned to electrically connect to the charging contacts of each slot of the support base, the holder further having a charging circuit connected to the output charging contacts and to the input charging contacts, the charging circuit to control charging of the cell through the output charging contacts using power drawn from the charging contacts of the support base through the input charging contacts of the holder.

2. The system of claim 1, wherein the support base further comprises a power source electrically connected to the electrical conductors of the support base, wherein the electrical conductors are pass-through conductors between the power source and the charging contacts of each slot of the array of slots.

3. The system of claim 1, further comprising a power source external to the support base, wherein the power source has a plurality of output ports, each output port to connect to electrical conductors of each slot.

4. The system of claim 1, wherein holder is shaped to receive and remove the cell when the holder is disposed in at least one slot of the array of slots, and wherein the support base is shaped to provide clearance for receiving and removing the cell from the holder when the holder is disposed in the at least one slot.

5. The system of claim 4, wherein the support base further comprises a locking structure for the at least one slot, the locking structure configured to releasably lock with a complementary locking structure on the holder.

6. The system of claim 1, wherein the charging circuit is configured to detect a charging requirement of the cell.

7. An apparatus for holding and charging a cell, the apparatus comprising:
   a housing shaped to define an internal volume to removably receive a cell to be charged, the housing further shaped to have an external profile that complements an internal profile of a slot of a support base to removably fit the housing into the slot;
   output charging contacts disposed at an inside of the housing, the output charging contacts positioned to electrically connect to contacts of the cell;
   input charging contacts disposed at an outside of the housing, the input charging contacts positioned to electrically connect to contacts of the support base disposed within the slot; and
   a charging circuit in the housing, the charging circuit connected to the output charging contacts and to the input charging contacts, the charging circuit to control charging of the cell through the output charging contacts with power drawn from the support base through the input charging contacts;
   wherein the external profile of the housing matches an external profile of a wireless communication device to removably fit the wireless communication device into the slot of the support base, the internal profile of the slot to thereby interchangeably receive the wireless communication device or the holder, and wherein a position of the output charging contacts matches a position of charging contacts of the wireless communication device.

8. The apparatus of claim 7, wherein the housing is shaped to receive and remove the cell when the housing is disposed in the slot of the support base.

9. The apparatus of claim 8, further comprising a locking structure at the housing, the locking structure configured to releasably lock with a complementary locking structure at the slot of the support base.

10. The apparatus of claim 7, wherein the input charging contacts are disposed in a receptacle defined in the outside of the housing.

11. The apparatus of claim 10, wherein the receptacle is shaped to receive a plug.

12. The apparatus of claim 7, further comprising a mounting structure at the outside of the housing, the mounting structure shaped to removably engage with a complementary mounting structure affixed to a support.

13. The apparatus of claim 7, wherein the charging circuit is configured to detect a charging requirement of the cell.

14. The apparatus of claim 7, further comprising an illuminating indicator connected to the charging circuit for indicating a charging state.

15. A apparatus for supporting and providing power to a wireless communication device and a cell for the wireless communication device, the apparatus comprising:
   a housing shaped to define an array of slots, each slot of the array of slots having an internal profile, the internal profile shaped to complement an external profile of the wireless communication device to removably receive the wireless communication device in the slot, the internal profile shaped to complement an external profile of a holder to removably receive the holder in the slot, the internal profile of each slot to thereby interchangeably receive the wireless communication device or the holder, the holder shaped to removably hold the cell, each slot having charging contacts positioned to electrically connect to contacts of the wireless communication device and to electrically connect to contacts of the holder; and electrical conductors disposed in the housing and electrically connected to the charging contacts of each slot for providing power to the charging contacts of each slot to charge either the wireless communication device or the holder of the cell when disposed in each slot, wherein the electrical conductors are pass-through conductors between a power source and the charging contacts of each slot.

16. The apparatus of claim 15, further comprising the power source, the power source electrically connected to the electrical conductors to convert alternating current (AC) wall power into direct current (DC) power for the charging contacts of each slot of the array of slots.

17. The apparatus of claim 16, wherein the power source is disposed in the housing.

18. The apparatus of claim 15, further comprising a power source external to the housing, wherein the power source has a plurality of output ports, each output port to connect to electrical conductors of each slot.

19. The apparatus of claim 15, wherein the housing is shaped to provide clearance for receiving and removing the cell from the holder when the holder is disposed in at least one slot of the array of slots.

20. The apparatus of claim 19, further comprising a locking structure for the at least one slot, the locking structure configured to releasably lock with a complementary locking structure on the holder.

* * * * *